March 18, 1930.  J. W. WHITE  1,750,655
WHEEL
Original Filed Nov. 3, 1924   2 Sheets-Sheet 1

Inventor
John William White
By Clarence S. Walker.
His Attorney

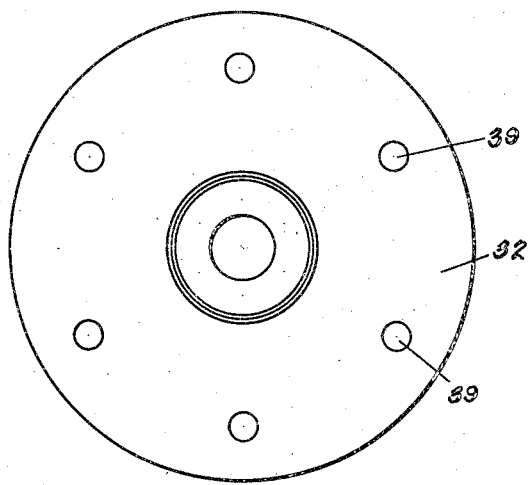
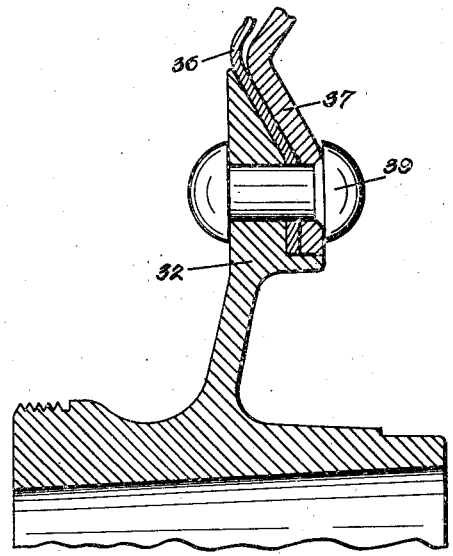
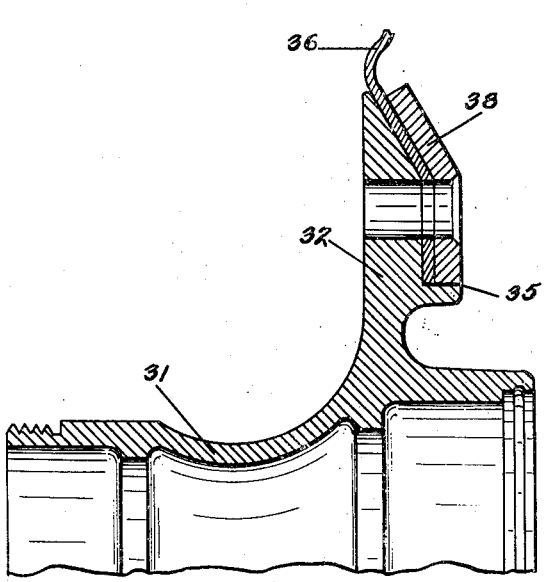
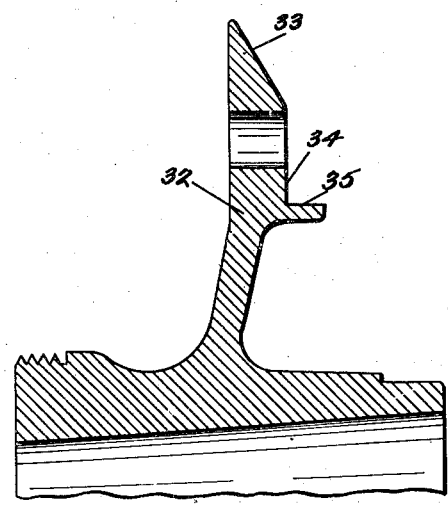

Patented Mar. 18, 1930

1,750,655

UNITED STATES PATENT OFFICE

JOHN WILLIAM WHITE, OF BUFFALO, NEW YORK, ASSIGNOR TO KELSEY-HAYES WHEEL CORPORATION, OF DETROIT, MICHIGAN, A CORPORATION OF NEW YORK

WHEEL

Application filed November 3, 1924, Serial No. 747,520. Renewed April 16, 1928.

This invention relates to an improvement in wheels, and more particularly to wheels of the disc type and to the mechanism by which the wheel disc is secured to the axle.

The primary object of this invention is to provide in a disc wheel a hub adapted to receive and support a brake drum in such a position that it forms the rear support for the wheel disc whether the wheel be demountable or non-demountable at the hub.

Another object of this invention is to provide in a disc wheel a rear support for the wheel disc beyond the diameter of the inner hub flange said disc being secured to both said support and said hub flange.

A further object of this invention is to provide in a disc wheel a hub having a single flange to the same face of which both the wheel disc and the disc support are secured.

Other objects of this invention will appear from the following description taken in connection with the drawings which form a part thereof, and in which:

Fig. 5 is a sectional side elevation of a portion of a front wheel embodying another form of this invention;

Fig. 6 is a similar view of a rear wheel;

Fig. 7 is a view of a rear hub; and

Fig. 8 is a front elevation on a small scale.

Figure 4:
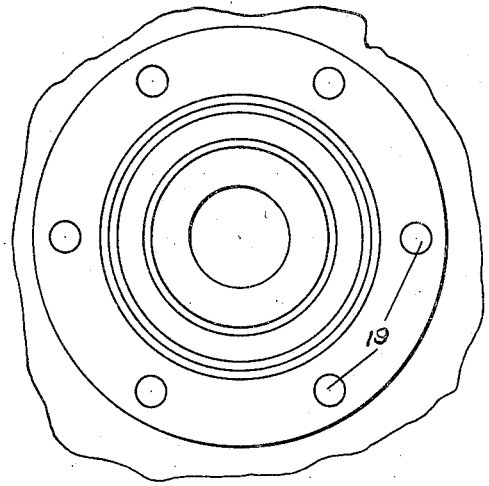
Fig. 4 is a front view of a wheel embodying this invention.
Figure 3:
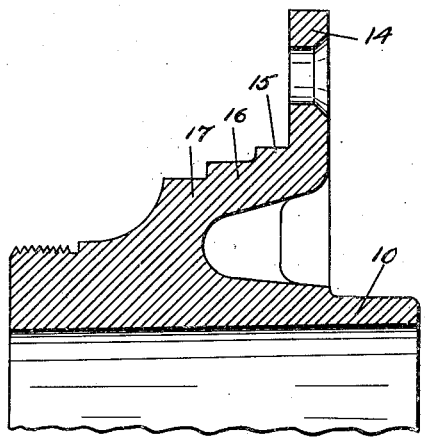
Fig. 3 is a view of a hub for a rear wheel.

Referring to the embodiments shown in Figs. 1, 2, 3, and 4, the reference numeral 10 is employed to designate the rear hub and the reference numeral 11 the front hub upon each of which hubs a wheel disc 12 is adapted to be removably mounted and held in position by means of an annular plate 13.

Due to the well-known difference in length of the front and rear axle of motor vehicles, it is of course necessary that the hub vary accordingly. However, the inner ends of all hubs made in accordance with this invention are identical in exterior contour and construction and the same reference numerals will be applied in each case. At the end of each of the inner hubs 10, 11 is provided a radial annular flange 14 in front of which is formed an annular seat 15. On each hub in front of the annular seat 15 is provided an annular seat 17, the diameter of which is less that that of the seat 15. The seat 17 is separated from the seat 15 by a portion 16 of the hub.

Figure 1:
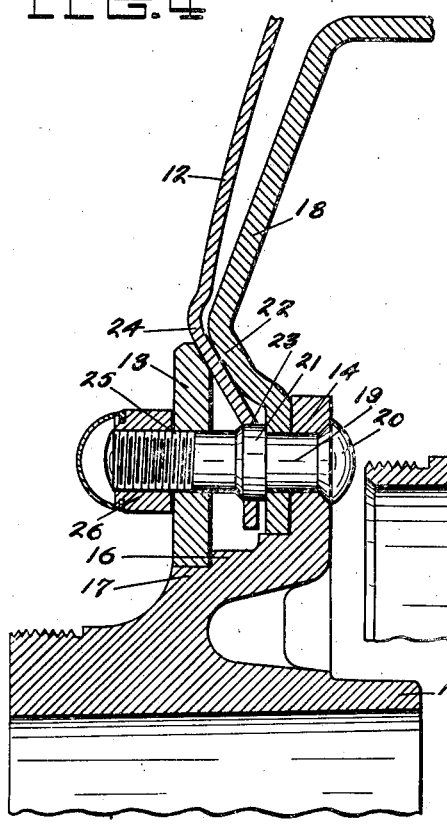
Fig. 1 is a sectional side elevation of a portion of a rear wheel embodying one form of this invention.
Figure 2:
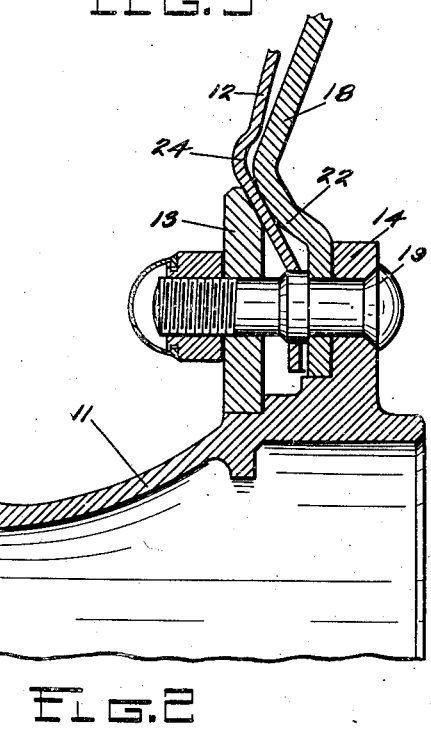
Fig. 2 is a similar view of a front wheel embodying this invention.

The construction illustrated is intended to form part of the equipment of a motor vehicle having four-wheel brakes, and mounted upon each hub is a brake drum, 18, which rests upon the seat 15 and bears against the outer face of the flange 14, being held in such position by the means of the bolt 19. The head 20 of the bolt is upset, as shown in Fig. 1, and an enlarged portion is provided which rests against the outer face of the drum so that the brake drum is permanently secured in position on the hub between the head 20 and the enlarged portion 21. The brake drum is provided with an outwardly inclined annular portion 22, the purpose of which will be set forth below.

The disc 12 is preferably the type shown in my Patent #1,473,368, dated November 6, 1923, provided with an annular series of apertures 23 through which the outer ends of the bolts 19 project. The disc 12 has an outwardly inclined annular portion 24, similar to the portion 22 of the brake drum 18 and is clamped against the brake drum by the plate 13, which is also provided with suitably spaced apertures 25, through which the bolts 19 project, so that the disc 12 and ring 13 are rigidly clamped on the hub against the brake drum 18 by means of nuts 26, mounted upon the threaded outer ends of the bolts 19. It will be noted that after removing the nuts 26, the ring 13 which rests on the seats 17 of the hub can be slipped off and the disc 12 demounted. The brake drum 18 thus takes the lateral pressure of the disc directly and transfers it to the hub flange. This permits the use of a smaller hub flange than that shown in my patent above referred.

Under certain circumstances it may be preferred to mount the disc rigidly upon the hub, and when such conditions arise the embodiment shown in Figs. 5, 6, 7, and 8 may be employed. Referring to these figures the reference numerals 31 and 30 are employed to designate front and rear hubs which differ in length as previously pointed out, but which like the hubs 10 and 11 are identical in the external contour and construction and are each provided with a radial annular flange 32. The inner face of the flange 32 is inclined at 33 adjacent its periphery and has a flat radial surface 34 below the inclined surface, the inner edge of which flat portion 34 is formed an inwardly projecting annular seat 35. The wheel disc 36, mounted upon the hub is the same as the disc 12, of the first embodiment, and rests upon the seat 35, the inner face of the flange 32 being shaped to coincide with the outer face of the disc. Against the inner face of the disc 36 and resting upon the seat 35 is mounted a brake drum 37 or, in the case of the front wheel of a vehicle having rear brakes only, a ring 38. Between the flange 32 and the brake drum 37 or between the flange 32 and the ring 38, the disc 36 is rigidly secured in position by means of a plurality of bolts 39, which are symmetrically arranged around the flange, as shown particularly in Fig. 8.

While two embodiments of this invention have been shown and described applicant is not to be limited thereby since it is obvious that others may be made without departing from the spirit and scope of the invention as set forth in the following claims.

Having thus set forth my invention what I claim as new and for which I desire protection by Letters Patent is:

1. In a disc wheel a hub having adjacent its inner end, an annular flange projecting radially therefrom, an annular seat on said hub in front of said flange, a second annular seat on said hub in front of and smaller in diameter than said first named seat, a wheel disc, a brake drum mounted behind said disc, on said first named seat, a clamping ring mounted in front of said disc on said second named seat and means for permanently securing said brake drum to said flange and for removably clamping said disc between said brake drum and said clamping means.

2. In a disc wheel a hub having, adjacent its inner end, an annular flange projecting radially therefrom, a brake drum mounted upon said hub, means securing said drum to said flange, said drum having an outwardly inclined annular portion outside said securing means, a wheel disc in front of said drum, an annular plate mounted upon said hub in front of said disc and means for clamping said disc between said plate and said drum, said disc being clamped by the plate adjacent its periphery against the outwardly inclined annular portion of said drum whereby the portion of the disc inside the periphery of the plate is unconfined.

3. In a disc wheel a hub having, adjacent its inner end, an annular flange projecting radially therefrom, a brake drum mounted upon said hub and secured to the outer face of said flange, said drum having an outwardly inclined annular portion, a wheel disc in front of said drum, which disc has an outwardly inclined annular portion similar in conformation to and located to engage the annular portion of the drum when the wheel is assembled, an annular plate on said hub in front of the wheel disc and means for clamping said plate against the annular portion of the disc and thereby clamping said disc against the annular portion of the brake drum whereby the portion of the disc inside the annular portion of the drum is unconfined.

In testimony whereof I have affixed my signature.

JOHN WILLIAM WHITE.